US007173380B2

(12) United States Patent
Ball

(10) Patent No.: US 7,173,380 B2
(45) Date of Patent: Feb. 6, 2007

(54) PUSH-PULL DRIVER WITH NULL-SHORT FEATURE

(75) Inventor: Newton E. Ball, Anaheim, CA (US)

(73) Assignee: Microsemi Corporation, Irvine, CA (US)

(*) Notice: Subject to any disclaimer, the term of this patent is extended or adjusted under 35 U.S.C. 154(b) by 0 days.

(21) Appl. No.: 11/181,503

(22) Filed: Jul. 14, 2005

(65) Prior Publication Data

US 2006/0017406 A1 Jan. 26, 2006

Related U.S. Application Data

(60) Provisional application No. 60/591,264, filed on Jul. 26, 2004.

(51) Int. Cl.
*H05B 37/02* (2006.01)
*H02M 7/538* (2006.01)

(52) U.S. Cl. ...................... 315/219; 315/226; 315/291; 363/133

(58) Field of Classification Search ............ 315/209 R, 315/212, 219, 221, 224–226, 291, 307; 363/133, 363/134

See application file for complete search history.

(56) References Cited

U.S. PATENT DOCUMENTS

| | | | | |
|---|---|---|---|---|
| 5,495,405 | A * | 2/1996 | Fujimura et al. | 363/133 |
| 5,510,974 | A * | 4/1996 | Gu et al. | 363/134 |
| 5,615,093 | A | 3/1997 | Nalbant | 363/25 |
| 5,619,402 | A | 4/1997 | Liu | 363/20 |
| 5,751,560 | A * | 5/1998 | Yokoyama | 363/18 |
| 5,892,336 | A | 4/1999 | Lin et al. | 315/291 |
| 5,923,129 | A | 7/1999 | Henry | 315/307 |
| 5,930,121 | A | 7/1999 | Henry | 363/16 |
| 6,104,146 | A | 8/2000 | Chou et al. | 315/277 |
| 6,114,814 | A | 9/2000 | Shannon et al. | 315/219 |
| 6,198,234 | B1 | 3/2001 | Henry | 315/291 |
| 6,259,615 | B1 | 7/2001 | Lin | 363/98 |
| 6,307,765 | B1 | 10/2001 | Choi | 363/134 |
| 6,316,881 | B1 | 11/2001 | Shannon et al. | 315/219 |
| 6,317,347 | B1 * | 11/2001 | Weng | 363/134 |
| 6,356,035 | B1 * | 3/2002 | Weng | 315/209 R |
| 6,396,722 | B2 | 5/2002 | Lin | 363/98 |
| 6,459,216 | B1 | 10/2002 | Tsai | 315/294 |
| 6,469,922 | B2 | 10/2002 | Choi | 363/134 |
| 6,515,881 | B2 | 2/2003 | Chou et al. | 363/95 |
| 6,531,831 | B2 | 3/2003 | Chou et al. | 315/225 |
| 6,559,606 | B1 | 5/2003 | Chou et al. | 315/194 |
| 6,570,344 | B2 | 5/2003 | Lin | 315/224 |
| 6,633,138 | B2 | 10/2003 | Shannon et al. | 315/224 |
| 7,075,245 | B2 * | 7/2006 | Liu | 315/219 |
| 2002/0180380 | A1 | 12/2002 | Lin | 315/224 |
| 2003/0161164 | A1 | 8/2003 | Shannon et al. | 363/40 |
| 2005/0218825 | A1 * | 10/2005 | Chiou | 315/209 R |

* cited by examiner

*Primary Examiner*—Thuy Vinh Tran
(74) *Attorney, Agent, or Firm*—Knobbe, Martens, Olson & Bear, LLP.

(57) ABSTRACT

A push-pull driver for powering fluorescent lamps in a backlight system includes a transformer with three primary windings to realize the advantages of both a push-pull switching topology and a full-bridge switching topology. The first and the second primary windings alternately conduct currents in opposite polarities to generate an alternating current signal to power one or more lamps coupled to a secondary winding of the transformer. The third primary winding is short-circuited to preserve energy stored in the transformer in a null state when both the first and the second primary windings are not conducting.

20 Claims, 1 Drawing Sheet

PUSH-PULL DRIVER WITH NULL-SHORT FEATURE

CLAIM FOR PRIORITY

This application claims the benefit of priority under 35 U.S.C. § 119(e) of U.S. Provisional Application No. 60/591,264, filed on Jul. 26, 2004, and entitled "System and Method for Driving CCFL Backlights Using a Push-Pull Inverter and a Transformer with Three Primary Windings," the entirety of which is incorporated herein by reference.

BACKGROUND

1. Field of the Invention

The invention generally relates to a driver circuit in a backlight system for powering fluorescent lamps, and more particularly, relates to a driver circuit that combines the advantages of a push-pull switching topology and a full-bridge switching topology.

2. Description of the Related Art

In liquid crystal display (LCD) applications, backlight is needed to illuminate a screen to make a visible display. A number of conventional inverter topologies (e.g., active clamping forward, phase-shifted full-bridge, resonant full-bridge, asymmetric half-bridge, push-pull, etc.) facilitate zero voltage or zero current switching to minimize switching stresses and losses. Among these conventional inverter topologies, the full-bridge topology and the push-pull topology are acceptable for cold cathode fluorescent lamp (CCFL) inverter applications because of their capability to produce symmetric lamp current waveforms.

Both the conventional full-bridge topology and the conventional push-pull topology have advantages and disadvantages for the CCFL inverter applications. The conventional full-bridge topology has an ability to control circuit behavior at all times. For example, a short circuit can be placed across a primary winding of a transformer in the conventional full-bridge topology when drive voltage is not applied to the primary winding. The conventional full-bridge topology advantageously preserves stored energy in the transformer or in inductor-capacitor (or tank) circuits.

In contrast, the conventional push-pull topology sometimes looses direct control of circuit behavior. For example, an open circuit is created within positive and negative power supply limits at primary windings of a transformer in the conventional push-pull topology when drive voltage is not applied to the primary windings. The conventional push-pull topology allows stored energy in the transformer and any tank circuits to leak back into primary winding circuits, often creating voltage spikes across switching transistors coupled to the primary windings. The cycle of energy storage and loss repeats for each cycle of the drive voltage. However, the conventional push-pull topology advantageously requires fewer driving control signals than the full-bridge topology, introduces less power loss in a power-delivering path and has fewer components.

The conventional full-bridge topology, on the other hand, generally has more complicated driving circuitry and is less power efficient. For example, the conventional full-bridge topology drives a set of upper switches and a set of lower switches. The upper switches and the lower switches often use different levels of gate drive control signals. In addition, the on-resistance of the upper switches appears as an $I^2R$ power loss in the power-delivering path.

SUMMARY

In one embodiment, the present invention proposes a push-pull driver with null-short feature that has advantages of both a conventional full-bridge topology and a conventional push-pull topology. For example, the push-pull driver with null-short feature restores control of circuit behavior when a drive voltage is inactive (or power is not being delivered to a load) without complicating driving control signals or introducing additional losses in a power delivery path. The push-pull driver with null-short feature advantageously allows the use of a push-pull controller to maintain benefits of the conventional push-pull topology while realizing the benefits of the conventional full-bridge topology. In other words, the push-pull controller appears to a transformer and its secondary winding in the push-pull driver with null-short feature as though it is a full-bridge controller.

In one embodiment, a push-pull driver (or inverter) includes a transformer with three primary windings and four semiconductor switches (or switching transistors). The transformer and the semiconductor switches are arranged in a push-pull switching topology. For example, the first semiconductor switch is coupled between a first terminal of the first primary winding and a reference node. The second semiconductor switch is coupled between a second terminal of the second primary winding and the reference node. A power supply (or voltage source) is coupled to a second terminal of the first primary winding and a first terminal of the second primary winding. In one embodiment, a current feedback circuit (e.g., a sensing resistor) is coupled between the reference node and ground to detect current levels in the first and the second primary windings.

The first and the second primary windings are configured to deliver power in alternating polarities (or phases) to a load (e.g., a lamp) coupled across a secondary winding of the transformer. For example, the first semiconductor switch and the second semiconductor switch alternately (or periodically) conduct to generate an alternating current (AC) signal across the secondary winding of the transformer. Power is delivered in a first polarity to the load when the first semiconductor switch is active, and power is delivered in a second (or opposite) polarity to the load when the second semiconductor switch is active. In one embodiment, the load includes at least one fluorescent lamp (or CCFL) for backlighting a display panel (e.g., a LCD).

The third semiconductor switch and the fourth semiconductor switch are respectively coupled between opposite terminals of the third primary winding and a common voltage (or regulated voltage). The third and the fourth semiconductor switches are active (or on) when the first and the second semiconductor switches are both inactive (or off). Thus, the third primary winding is configured to be short-circuited when power is not delivered to the load. Shorting the third primary winding advantageously freezes (or substantially maintains) the flux state of the transformer core and minimizes losses (or improves power efficiency).

In one embodiment, the three primary windings are trifilar windings or wound side-by-side in a single layer on a bobbin. The first and the second primary windings have approximately the same number of turns. The first and the second primary windings can be part of one primary winding with a center-tap for coupling to the power supply and opposite terminals for coupling to the first semiconductor switch and the second semiconductor switch respectively. In one embodiment, the three primary windings have approximately the same number of turns (e.g., 17).

In one embodiment, the first and the second semiconductor switches are N-type transistors (e.g., N-type field-effect-transistors or bipolar junction transistors) while the third and the fourth semiconductor switches are P-type transistors. In alternate embodiments, the first and the second semiconductor switches are P-type transistors while the third and the fourth semiconductor switches are N-type transistors. The four semiconductor switches can be advantageously controlled by a push-pull controller that outputs two driving signals. For example, the first driving signal controls the first and the third semiconductor switches while the second driving signal controls the second and the fourth semiconductor switches.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

These drawings and the associated description herein are provided to illustrate embodiments and are not intended to be limiting.

DETAILED DESCRIPTION OF EMBODIMENTS

Although particular embodiments are described herein, other embodiments, including embodiments that do not provide all of the benefits and features set forth herein, will be apparent to those of ordinary skill in the art.

Figure 1:
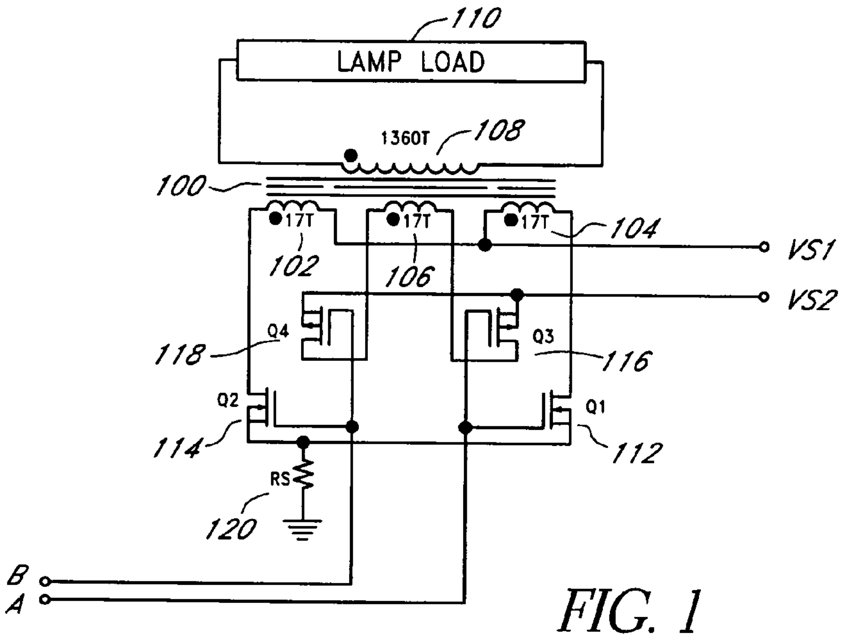
FIG. 1 illustrates one embodiment of a push-pull driver with null-short feature.

FIG. 1 illustrates one embodiment of a push-pull driver with null-short feature. The push-pull driver (or inverter) includes a transformer 100 with a first primary winding 104, a second primary winding 102 and a third primary winding 106. A first terminal of the second primary winding 102 and a second terminal of the first primary winding 104 are commonly connected to a power supply (VS1). A lamp load 110 is coupled across a secondary winding 108 of the transformer 100. The lamp load 110 can include one or more CCFLs in a backlight system for LCD applications.

The push-pull driver also includes four semiconductor switches (or switching transistors) 112, 114, 116, 118 coupled to the transformer 100. The four semiconductor switches 112, 114, 116, 118 can be P-type or N-type transistors (e.g., bipolar junction transistors or field-effect-transistors). In the embodiment shown in FIG. 1, the first and the second semiconductor switches 112, 114 are N-type metal-oxide-semiconductor field-effect-transistors (N-MOSFETs) while the third and the fourth semiconductor switches 116, 118 are P-MOSFETs. The first and the second semiconductor switches 112, 114 contribute to losses in power delivered to the lamp load 110. Although P-MOSFETs can be used to implement the first and the second semiconductor switches 112, 114, N-MOSFETs typically have lower on-resistance to reduce power loss. The third and the fourth semiconductor switches 116, 118 conduct magnetizing current and do not contribute to power loss.

The first semiconductor switch (Q1) 112 has a drain terminal coupled to a first terminal of the first primary winding 104 and a source terminal coupled to a reference node. The second semiconductor switch (Q2) 114 has a drain terminal coupled to a second terminal of the second primary winding 102 and a source terminal coupled to the reference node. In the embodiment shown in FIG. 1, a sensing resistor (RS) 120 is coupled between the reference node and ground for detecting current levels in the first primary winding 104 and the second primary winding 102. The third semiconductor switch (Q3) 116 has a drain terminal coupled to a first terminal of the third primary winding 106 and a source terminal coupled to a common voltage (VS2). The fourth semiconductor switch (Q4) 118 has a drain terminal coupled to a second terminal of the third primary winding 106 and a source terminal coupled to the common voltage.

A first driving signal (A) is coupled to gate terminals of the first semiconductor switch 112 and the third semiconductor switch 116. A second driving signal (B) is coupled to gate terminals of the second semiconductor switch 114 and the fourth semiconductor switch 118. The first driving signal and the second driving signal are periodically active to generate an AC signal (e.g., lamp signal) to power the lamp load 110. For example, the first driving signal is active (or logic high) for a first duration to turn on the first semiconductor switch 112. Current flows in the first primary winding 104 when the first semiconductor switch 112 is on and a corresponding current flows in a first direction (or polarity) in the secondary winding 108. The second driving signal is active for a second duration to turn on the second semiconductor switch 114. Current flows in the second primary winding 102 when the second semiconductor switch 114 is on and a corresponding current flows in a second direction in the secondary winding 108.

The active states of the first driving signal and the second driving signal do not overlap. When the first driving signal is inactive (or logic low), the third semiconductor switch 116 is active (or on) and couples the first terminal of the third primary winding 106 to the common voltage. When the second driving signal is inactive, the fourth semiconductor switch 118 is on and couples the second terminal of the third primary winding 106 to the common voltage. Thus, when both the first driving signal and the second driving signal are inactive, the third primary winding 106 is effectively short-circuited and conducts a magnetizing current. Shorting the third primary winding 106 advantageously freezes (or substantially maintains) the flux state of the transformer core during a null state when neither the first semiconductor switch 112 nor the second semiconductor switch 114 are active to deliver power (or pulse of energy) to the lamp load 110. Shorting the third primary winding 106 during the null state advantageously minimizes losses and improves power efficiency. Although the embodiment shown in FIG. 1 uses two semiconductor switches 116, 118 controlled by two driving signals (A, B) to short the third primary winding 106, other configurations are possible to short the third primary winding 106 during the null state.

The first primary winding 104 and the second primary winding 102 have approximately the same number of turns. The third primary winding 106 is configured to conduct magnetizing current and can have an arbitrary number of turns. In one embodiment, the three primary windings 102, 104, 106 are tri-filar windings or wound side-by-side in a single layer on a bobbin with approximately the same number of turns (e.g., 17). The first and the second primary windings (or power windings) 104, 102 can be part of one primary winding with a center-tap for coupling to the power supply and opposite terminals for coupling to the first semiconductor switch 112 and the second semiconductor switch 114 respectively. The power supply can be a direct current (DC) voltage source (e.g., a battery) with a range of amplitudes (e.g., from approximately 10–20 volts).

Figure 2:
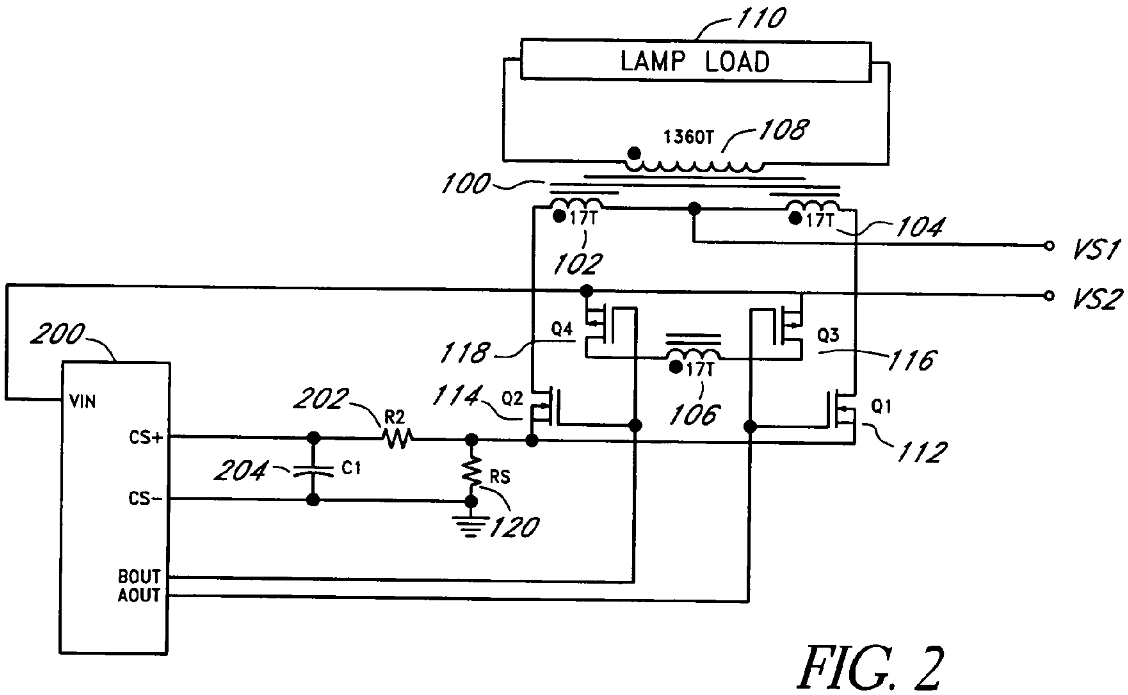
FIG. 2 illustrates another embodiment of a push-pull driver with null-short feature and connections to a push-pull controller.

FIG. 2 illustrates another embodiment of a push-pull driver with null-short feature and connections to a push-pull controller 200. The push-pull driver shown in FIG. 2 is substantially similar to the push-pull driver shown in FIG. 1 with an additional filter resistor (R2) 202, a filter capacitor (C1) 204 and the push-pull controller 200. The transformer 100 and connections of the primary windings 102, 104, 106 to the semiconductor switches 112, 114, 116, 118 are schematically equivalent to the embodiment shown in FIG. 1. The primary windings 102, 104, 106, however, are drawn to show the first primary winding 104 and the second primary winding 102 as a center-tap primary winding.

The filter resistor 202 is coupled between the reference node and a first terminal of the filter capacitor 204. A second terminal of the filter capacitor 204 is coupled to ground. The voltage across the filter capacitor 204 is provided to current sense inputs (CS+, CS−) of the push-pull controller 200. The voltage across the filter capacitor 204 provides an indication of an average current level conducted by the first and the second primary windings 104, 102 which is used to control power delivered to the lamp load 110 (or brightness of the lamp load 110). For example, the active durations of the first and the second driving signals can be increased to increase power (or brightness) for the lamp load 110 or decreased to decrease power for the lamp load 110. The push-pull controller 200 outputs two gate drive control signals (Aout, Bout) corresponding to the first driving signal and the second driving signal. In one embodiment, the push-pull controller 200 is powered by a regulated voltage (Vin) that has approximately the same voltage (e.g., 10 volts) as the common voltage (VS2).

The push-pull driver with null-short feature described above improves power efficiency to prolong battery life while saving circuit board space which can be used for other functions (e.g., ambient light control). Similar to a conventional push-pull topology, the gate drive control signals are simple and power loss of one semiconductor switch (e.g., an N-MOSFET) appears in the power-delivering path. Similar to a conventional full-bridge topology, a short circuit is placed across a primary winding of a transformer when power is not applied to the transformer to preserve energy stored in the transformer or any resonant tank circuits. The push-pull controller 200 of the push-pull driver with null-short feature advantageously maintains direct control of the transformer 100 when both the first and the second semiconductor switches 112, 114 are inactive. In other words, the push-pull driver with null-short feature allows a push-pull controller 220 to appear as a full-bridge controller to the core and secondary side of the transformer 100.

Various embodiments have been described above. Although described with reference to these specific embodiments, the descriptions are intended to be illustrative and are not intended to be limiting. Various modifications and applications may occur to those skilled in the art without departing from the true spirit and scope of the invention as defined by the appended claims.

What is claimed is:

1. A push-pull inverter comprising:

a transformer with three primary windings and a secondary winding, wherein the first and the second primary windings are configured to deliver power in alternating polarities to a load coupled across the secondary winding while the third primary winding is configured to be short-circuited when power is not delivered to the load;

a first semiconductor switch coupled between a first terminal of the first primary winding and a reference node, wherein a second terminal of the first primary winding is coupled to a power supply and power is delivered in a first polarity to the load when the first semiconductor switch is active;

a second semiconductor switch coupled between a second terminal of the second primary winding and a reference node, wherein a first terminal of the second primary winding is coupled to the power supply and power is delivered in a second polarity to the load when the second semiconductor switch is active; and a third semiconductor switch and a fourth semiconductor switch respectively coupled between opposite terminals of the third primary winding and a common voltage, wherein the third semiconductor switch and the fourth semiconductor switch are active when the first semiconductor switch and the second semiconductor switch are both inactive.

2. The push-pull inverter of claim 1, wherein the first primary winding and the second primary winding are part of one primary winding with a center-tap for coupling to the power supply and opposite terminals for coupling to the first semiconductor switch and the second semiconductor switch respectively.

3. The push-pull inverter of claim 1, wherein the three primary windings have approximately the same number of turns.

4. The push-pull inverter of claim 1, wherein the three primary windings are tri-filar windings.

5. The push-pull inverter of claim 1, wherein the load comprises at least one cold cathode fluorescent lamp for backlighting a display panel.

6. The push-pull inverter of claim 1, wherein the first semiconductor switch and the second semiconductor switch are N-type transistors while the third semiconductor switch and the fourth semiconductor switch are P-type transistors.

7. The push-pull inverter of claim 1, further comprising a controller configured to output a first driving signal and a second driving signal, wherein the first driving signal controls the first semiconductor switch and the third semiconductor switch while the second driving signal controls the second semiconductor switch and the fourth semiconductor switch.

8. The push-pull inverter of claim 1, further comprising a current feedback circuit coupled between the reference node and ground.

9. The push-pull inverter of claim 1, further comprising a sensing resistor coupled between the reference node and ground.

10. A method to operate a push-pull inverter with null-short feature, the method comprising:

providing a power source to a first terminal of a first primary winding and a second terminal of a second primary winding of a transformer, wherein a lamp load is coupled across a secondary winding of the transformer;

activating a first switching transistor to deliver power in a first polarity to the lamp load, wherein the first switching transistor is coupled to a secondary terminal of the first primary winding;

activating a second switching transistor to deliver power in a second polarity to the lamp load, wherein the second switching transistor is coupled to a first terminal of the second primary winding; and activating a third switching transistor and a fourth switching transistor to short-circuit a third primary winding when the first switching transistor and the second switching transistor are both inactive.

11. The method of claim 10, wherein the first primary winding and the second primary winding have approximately equal number of turns.

12. The method of claim 10, wherein the three primary windings are wound together side-by-side in a single layer on a bobbin.

13. The method of claim 10, wherein the lamp load comprises one or more fluorescent lamps to backlight a liquid crystal display.

14. The method of claim 10, wherein the first switching transistor and the second switching transistor are N-type field-effect-transistors while the third switching transistor and the fourth switching transistor are P-type field-effect-transistors.

15. The method of claim 10, wherein the first switching transistor and the third switching transistor are activated by a first control signal while the second switching transistor and the fourth switching transistor are activated by a second control signal.

16. A push-pull inverter comprising:

means for periodically conducting power in a first polarity in a first primary winding of a transformer;

means for periodically conducting power in a second polarity in a second primary winding of the transformer, wherein the power conducted by the first primary winding and the second primary winding is delivered in alternating polarities to a lamp coupled to a secondary winding of the transformer; and means for shorting a third primary winding of the transformer when power is not delivered to the lamp.

17. The push-pull inverter of claim 16, wherein power conduction by the first primary winding is controlled by a first signal, power conduction by the second primary winding is controlled by a second signal, and shorting of the third primary winding is controlled by the first and the second signals.

18. The push-pull inverter of claim 16, further comprising means for sensing current levels in the first primary winding and the second primary winding.

19. The push-pull inverter of claim 16, wherein the lamp is part of a backlight system in a visual display.

20. The push-pull inverter of claim 16, wherein the first, the second and the third primary windings each have approximately 17 turns.

* * * * *